(12) United States Patent
Murata et al.

(10) Patent No.: US 12,358,444 B2
(45) Date of Patent: Jul. 15, 2025

(54) ROUTING STRUCTURE OF WIRING MEMBER

(71) Applicant: SUMITOMO WIRING SYSTEMS, LTD., Yokkaichi (JP)

(72) Inventors: Takahiro Murata, Yokkaichi (JP); Naofumi Yamatake, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 189 days.

(21) Appl. No.: 18/013,621

(22) PCT Filed: Jul. 12, 2021

(86) PCT No.: PCT/JP2021/026063
§ 371 (c)(1),
(2) Date: Dec. 29, 2022

(87) PCT Pub. No.: WO2022/014511
PCT Pub. Date: Jan. 20, 2022

(65) Prior Publication Data
US 2023/0294619 A1    Sep. 21, 2023

(30) Foreign Application Priority Data
Jul. 13, 2020  (JP) ................... 2020-119761

(51) Int. Cl.
*B60R 16/02*      (2006.01)
*B60K 7/00*       (2006.01)
*H02G 3/22*       (2006.01)

(52) U.S. Cl.
CPC ........ *B60R 16/0215* (2013.01); *B60K 7/0007* (2013.01); *H02G 3/22* (2013.01)

(58) Field of Classification Search
CPC ......... B60R 6/02; B60R 6/0215; B60K 7/007; H02G 3/22
See application file for complete search history.

(56) References Cited

U.S. PATENT DOCUMENTS

| 1,922,493 A | 8/1933 | Murray |
| 4,383,148 A | 5/1983 | Arima et al. |

(Continued)

FOREIGN PATENT DOCUMENTS

| CN | 107380258 A | 11/2017 |
| CN | 107895605 A | 4/2018 |

(Continued)

OTHER PUBLICATIONS

Jul. 4, 2023 Office Action issued in Japanese Patent Application No. 2020-119749.

(Continued)

*Primary Examiner* — Paresh Paghadal
(74) *Attorney, Agent, or Firm* — Oliff PLC

(57) ABSTRACT

A routing structure of a wiring member includes: an in-wheel motor unit including an in-wheel motor and a casing housing the in-wheel motor; and a wiring member connecting the in-wheel motor and a vehicle body side apparatus. In the wiring member, an end portion connected to the in-wheel motor is a first fixing portion, and a portion fixed to a vehicle subsequently to the end portion is a second fixing portion. A wiring fixing part to which the second fixing portion is fixed is provided to the casing.

7 Claims, 4 Drawing Sheets

(56) References Cited

U.S. PATENT DOCUMENTS

| | | | |
|---|---|---|---|
| 5,450,320 A | 9/1995 | Tsubaki et al. | |
| 2007/0234559 A1* | 10/2007 | Tokuda | B60K 7/0007 140/92.1 |
| 2008/0078317 A1 | 4/2008 | Furuya et al. | |
| 2009/0101429 A1 | 4/2009 | Williams | |
| 2009/0321171 A1 | 12/2009 | Hakansson | |
| 2013/0009450 A1 | 1/2013 | Suzuki et al. | |
| 2013/0234425 A1 | 9/2013 | Skowronek et al. | |
| 2013/0277128 A1 | 10/2013 | Gillett | |
| 2013/0284528 A1 | 10/2013 | Kawasaki et al. | |
| 2014/0318879 A1 | 10/2014 | Gillett | |
| 2016/0083003 A1 | 3/2016 | Huang et al. | |
| 2017/0369007 A1* | 12/2017 | Tamura | H02G 3/0406 |
| 2019/0077342 A1 | 3/2019 | Okamoto et al. | |
| 2019/0111865 A1* | 4/2019 | Tamura | B60G 13/00 |
| 2019/0152505 A1 | 5/2019 | Hansen et al. | |

FOREIGN PATENT DOCUMENTS

| | | |
|---|---|---|
| DE | 19756057 A1 | 7/1999 |
| DE | 19900083 A1 | 7/2000 |
| JP | H06-135253 A | 5/1994 |
| JP | 2005-271909 A | 10/2005 |
| JP | 2005-62388 A | 3/2006 |
| JP | 2006-240430 A | 9/2006 |
| JP | 2007-313984 A | 12/2007 |
| JP | 2008-308033 A | 12/2008 |
| JP | 2011-201375 A | 10/2011 |
| JP | 2013-147084 A | 8/2013 |
| JP | 2013-209016 A | 10/2013 |
| JP | 2015-137065 A | 7/2015 |
| JP | 2016-063608 A | 4/2016 |
| JP | 2016-088269 A | 5/2016 |
| JP | 2016-107659 A | 6/2016 |
| JP | 2017-190117 A | 10/2017 |
| JP | 2018-065545 A | 4/2018 |
| JP | 2020-104766 A | 7/2020 |
| WO | 9930955 A1 | 6/1999 |
| WO | 2022014477 A1 | 1/2022 |

OTHER PUBLICATIONS

Jul. 4, 2023 Office Action issued in Japanese Patent Application No. 2020-119748.
Jul. 25, 2023 Office Action issued in Japanese Patent Application No. 2020-119752.
Sep. 7, 2021 International Search Report issued in International Patent Application No. PCT/JP2021/024731.
Sep. 7, 2021 International Search Report issued in International Patent Application No. PCT/JP2021/025916.
Sep. 7, 2021 International Search Report issued in International Patent Application No. PCT/JP2021/025917.
Sep. 14, 2021 International Search Report issued in International Patent Application No. PCT/JP2021/025883.
Sep. 28, 2021 International Search Report issued in International Patent Application No. PCT/JP2021/026063.
Jan. 17, 2023 International Preliminary Report on Patentability issued in International Patent Application No. PCT/JP2021/026063.
Jan. 17, 2023 International Preliminary Report on Patentability issued in International Patent Application No. PCT/JP2021/025883.
Jan. 17, 2023 International Preliminary Report on Patentability issued in International Patent Application No. PCT/JP2021/024731.
Jan. 17, 2023 International Preliminary Report on Patentability issued in International Patent Application No. PCT/JP2021/025916.
Jan. 17, 2023 International Preliminary Report on Patentability issued in International Patent Application No. PCT/JP2021/025917.
U.S. Appl. No. 18/014,041, filed Dec. 30, 2022 in the name of Murata et al.
U.S. Appl. No. 18/013,629, filed Dec. 29, 2022 in the name of Murata et al.
U.S. Appl. No. 18/013,943, filed Dec. 30, 2022 in the name of Murata et al.
U.S. Appl. No. 18/013,714, filed Dec. 29, 2022 in the name of Murata et al.
Aug. 22, 2023 Office Action issued in Japanese Patent Application No. 2020-119761.
Aug. 22, 2023 Office Action issued in Japanese Patent Application No. 2020-119758.
Dec. 5, 2023 Office Action issued in Japanese Patent Application No. 2020-119749.
Dec. 26, 2023 Office Action issued in Japanese Patent Application No. 2020-119761.
Sep. 24, 2024 Non-Final Rejection received in U.S. Appl. No. 18/014,041.
Oct. 18, 2024 Office Action issued in Chinese Patent Application No. 202180046018.3.
Mar. 27, 2025 Office Action issued in U.S. Appl. No. 18/013,943.
Apr. 8, 2025 Office Action issued in Japanese Patent Application No. 2024-072822.
Apr. 8, 2025 Office Action issued in Chinese Patent Application No. 202180046018.3.
Jun. 3, 2025 Office Action issued in Japanese Patent Application No. 2020-119758.

* cited by examiner

F I G. 1
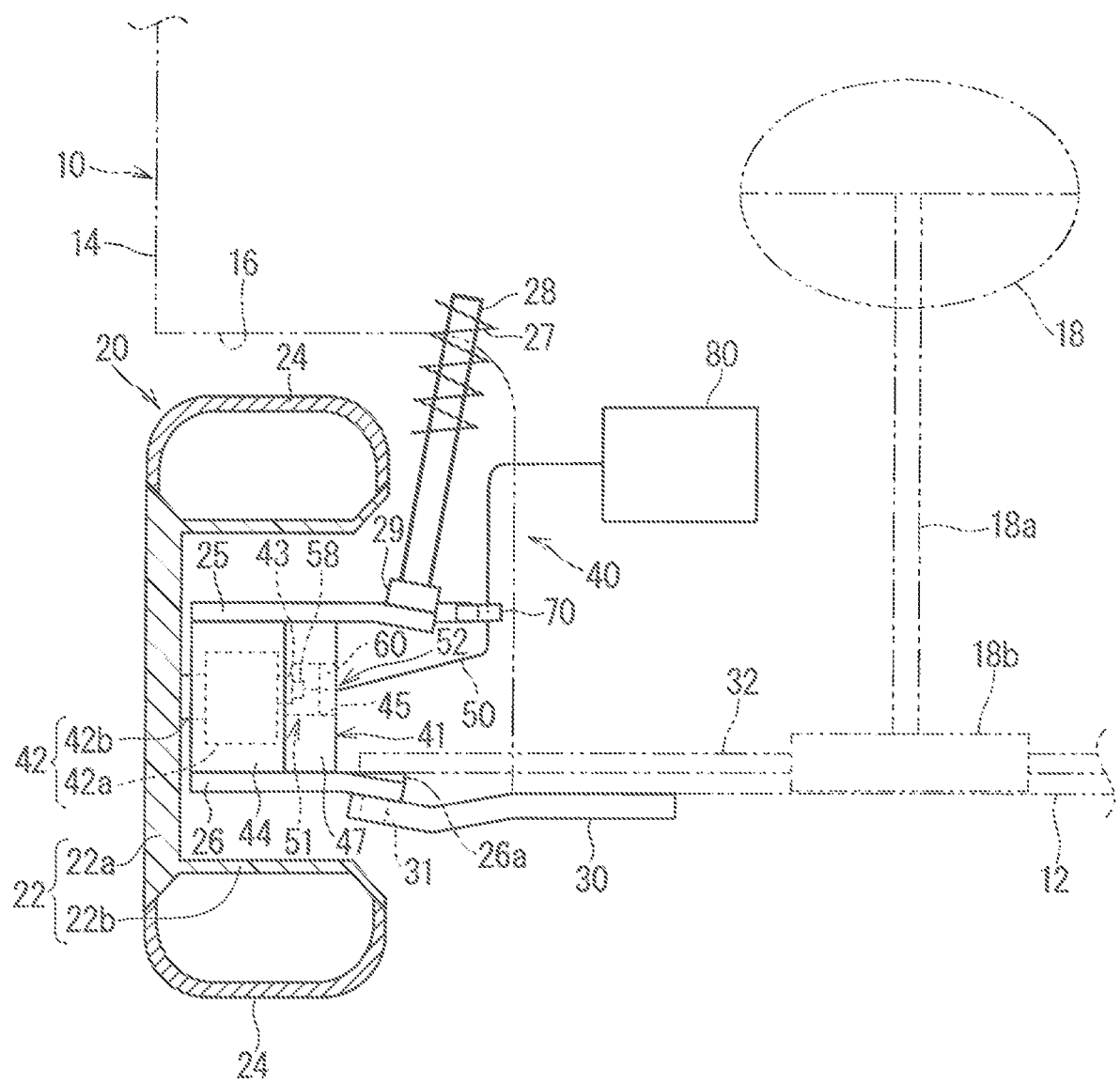

ROUTING STRUCTURE OF WIRING MEMBER

TECHNICAL FIELD

The present disclosure relates to a routing structure of a wiring member.

BACKGROUND ART

Patent Document 1 discloses a wiring device supplying an electrical signal from a vehicle body to an in-wheel motor. In Patent Document 1, an end portion of a wiring is fixed to a connector part of the in-wheel motor. In order to reduce load on the end portion of the wiring, a next fixing portion of the end portion of the wiring is fixed near a king pin as a center of rotation in changing an angle of a tire in accordance with a handle rotation.

PRIOR ART DOCUMENTS

Patent Document(s)

Patent Document 1: Japanese Patent Application Laid-Open No. 2005-271909

SUMMARY

Problem to be Solved by the Invention

Desired is increase in a degree of freedom of a route of a wiring member connected to an in-wheel motor.

Accordingly, an object is to increase a degree of freedom of a route of a wiring member connected to an in-wheel motor.

Means to Solve the Problem

A routing structure of a wiring member according to the present disclosure is a routing structure of a wiring member including: an in-wheel motor unit including an in-wheel motor and a casing housing the in-wheel motor; and a wiring member connecting the in-wheel motor and a vehicle body side apparatus, wherein in the wiring member, an end portion connected to the in-wheel motor is a first fixing portion, and a portion fixed to a vehicle subsequently to the end portion is a second fixing portion, and a wiring fixing part to which the second fixing portion is fixed is provided to the casing.

Effects of the Invention

According to the present disclosure, a degree of freedom of a route of a wiring member connected to an in-wheel motor can be increased.

BRIEF DESCRIPTION OF DRAWINGS

FIG. 1 is a schematic cross-sectional view illustrating a routing structure of a wiring member according to an embodiment 1.

DESCRIPTION OF EMBODIMENT(S)

Description of Embodiment of Present Disclosure

Figure 2:
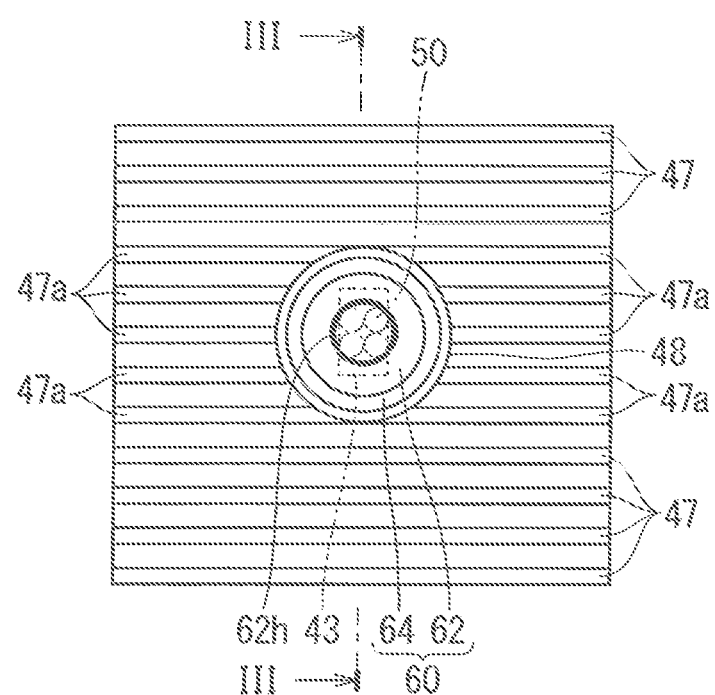
FIG. 2 is a front view illustrating a casing in an in-wheel motor unit.

Embodiments of the present disclosure are listed and described firstly.

A routing structure of a wiring member according to the present disclosure is as follows.

(1) A routing structure of a wiring member includes: an in-wheel motor unit including an in-wheel motor and a casing housing the in-wheel motor; and a wiring member connecting the in-wheel motor and a vehicle body side apparatus, wherein in the wiring member, an end portion connected to the in-wheel motor is a first fixing portion, and a portion fixed to a vehicle subsequently to the end portion is a second fixing portion, and a wiring fixing part to which the second fixing portion is fixed is provided to the casing. The second fixing portion is fixed to the wiring fixing part of the casing, thus the second fixing portion needs not be fixed to a component disposed around the in-wheel motor unit. Accordingly, a degree of freedom of a route of a wiring member connected to an in-wheel motor can be increased.

(2) In the routing structure of the wiring member according to (1), it is also applicable that a concave portion is formed in the casing, the first fixing portion is fixed to a position of a bottom portion of the concave portion, and the second fixing portion is fixed to a portion of the casing forming an opening part of the concave portion. Accordingly, the wire-like transmission member can be fixed without bending as much as possible between the first fixing portion and the second fixing portion.

(3) In the routing structure of the wiring member according to (2), it is also applicable that the casing includes a heat radiation fin, and at least a part of the heat radiation fin is used as the wiring fixing part. Accordingly, the concave portion can be provided using a space for providing the heat radiation fin.

(4) The routing structure of the wiring member according to (2) or (3) may further include a cover member provided around the wiring member in the second fixing portion to cover the opening part. Accordingly, the second fixing portion can be simply attached to the casing.

(5) In the routing structure of the wiring member according to (4), it is also applicable that the cover member includes a body part and an outer peripheral part around the body part, the body part is formed of an elastic material, the wiring member passes through a hole formed in the body part, and the outer peripheral part includes a screw-shaped part formed to have a screw-like shape by a material having higher rigidity than the elastic material. The body part is formed of the elastic material, thus can be firmly attached to the wiring member, and slip of the wiring member can be suppressed. The cover member is simply attached to the casing by the outer peripheral part formed to have the screw-like shape.

(6) In the routing structure of the wiring member according to (5), the body part may be firmly attached to the outer peripheral part, the wiring member, and the casing. Accordingly, a simple water stop structure of stopping water inside the concave portion is provided.

(7) In the routing structure of the wiring member according to (6), it is also applicable that the body part is provided with a first lip, a second lip, and a third lip, the first lip is provided to a portion of the body part having contact with the casing, the second lip is provided to a portion of the body part having contact with the outer peripheral part, and the third lip is provided to a portion of the body part having contact with the wiring member. Accordingly, a water stop property inside the concave portion is improved.

(8) In the routing structure of the wiring member according to any one of (1) to (7), it is also applicable that the wiring member includes a plurality of wire-like transmission members and a sheath covering the plurality of wire-like transmission members, and an end portion of the sheath is located between the first fixing portion and the second fixing portion. Accordingly, the plurality of wire-like transmission members can be easily handled when the second fixing portion is attached to the casing.

DETAILS OF EMBODIMENT OF PRESENT DISCLOSURE

Specific examples of a routing structure of a wiring member according to the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 3:
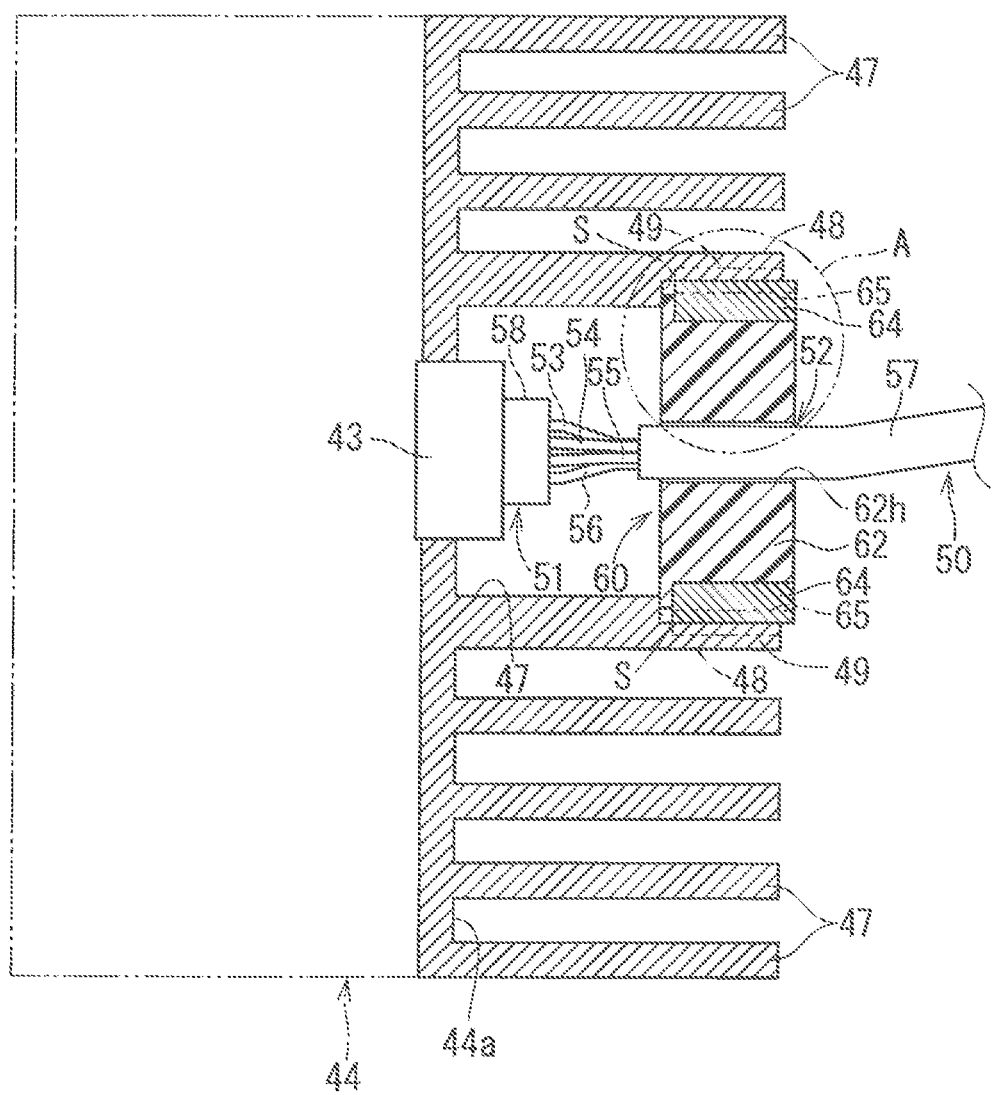
FIG. 3 is a cross-sectional view cut along a III-III line in FIG. 2.

A routing structure of a wiring member according to an embodiment 1 is described hereinafter. FIG. 1 is a schematic cross-sectional view illustrating a routing structure 40 of a wiring member according to the embodiment 1. FIG. 1 is a schematic cross-sectional view of a plane perpendicular to a front-back direction of a vehicle body 10 and passing through a central axis of a vehicle wheel 20. FIG. 1 illustrates a cross-sectional view of the vehicle wheel 20. FIG. 2 is a front view illustrating a casing 44 in an in-wheel motor unit 41. FIG. 2 is a diagram of the vehicle body 10 viewed in a right-left direction. FIG. 3 is a cross-sectional view cut along a III-III line in FIG. 2. FIG. 3 illustrates a cross-sectional view of a part of the casing 44 and a cover member 60.

<Routing Structure of Wiring Member>

The routing structure 40 of the wiring member includes the in-wheel motor unit 41 and the wiring member 50. The wiring member 50 is a wiring member connecting an in-wheel motor 42 in the in-wheel motor unit 41 and a vehicle body side apparatus 80. The wiring member 50 is routed along a route connecting the in-wheel motor 42 and the vehicle body side apparatus 80.

<Application Target of Routing Structure of Wiring Member>

A configuration of a portion where the routing structure 40 of the wiring member is applied is described for convenience of description.

The routing structure 40 of the wiring member is applied to an undercarriage of a vehicle. The vehicle body 10 in which a part of the wiring member 50 is routed is a vehicle body of an automobile. FIG. 1 illustrates a portion around the vehicle wheel 20 on a front side in the vehicle body 10. FIG. 1 is based on an assumption that the vehicle wheel 20 is steered with steering. The wiring member 50 may be used for a vehicle wheel which is not steered with steering. The vehicle wheel 20 may be a front wheel or a rear wheel.

The vehicle body 10 includes a floor part 12 and a body part 14. The floor part 12 is a portion facing a ground. The body part 14 is provided to an upper side of the floor part 12 to constitute an exterior of the vehicle body 10. The vehicle body 10 may be a monocoque body made up of a frame and a body as rigid bodies integrated with each other, or may have a configuration in which a body is mounted on a frame. In the present embodiment, a travel direction in a case where an automobile normally travels is referred to as a front, and a side opposite thereto is referred to as a back in some cases.

The vehicle wheel 20 is rotatably supported on the vehicle body 10. In the example illustrated in FIG. 1, the vehicle wheel 20 is rotatably supported in a fender apron 16. Any suspension type such as an independent suspension type, for example, may be applied to a suspension device to support the vehicle wheel 20. FIG. 1 illustrates an example that a damper 28 and a lower arm 30 support the vehicle wheel 20. A suspension device illustrated in FIG. 1 is an example of a strut-type suspension device.

The vehicle wheel 20 includes a disk wheel 22 and a tire 24. The disk wheel 22 is formed of metal such as iron or aluminum. The disk wheel 22 includes a disk part 22a and a tire attachment part 22b.

The disk part 22a is formed into a circular plate-like shape. The disk part 22a is fixed to a wheel hub not shown in the diagrams, for example. The wheel hub is rotatably supported by the knuckle parts 25 and 26. The knuckle parts 25 and 26 are supported on the vehicle body 10 via the damper 28 and the lower arm 30.

The tire attachment part 22b is an annular portion protruding from a surrounding area of the disk part 22a to an inner side in a vehicle width direction. An annular rim protrudes on both side edges of the tire attachment part 22b. The tire 24 formed by an elastic member such as rubber is attached to an outer periphery of the tire attachment part 22b described above.

In the example illustrated in FIG. 1, the upper knuckle part 25 and the lower knuckle part 26 are provided as the knuckle parts 25 and 26.

The upper knuckle part 25 extends toward an inner side in the vehicle width direction from the wheel hub on an upper side of a rotational axis of the vehicle wheel 20. The spring 27 and the damper 28 are provided between the upper knuckle part 25 and the vehicle body 10. More specifically, an upper end portion of the damper 28 is supported on the vehicle body 10 on an upper side of the vehicle wheel 20. The upper knuckle part 25 is rotatably supported on the lower end portion of the damper 28 via a bearing part 29.

The lower knuckle part 26 extends toward an inner side in the vehicle width direction from the wheel hub on a lower side of the rotational axis of the vehicle wheel 20. The lower knuckle part 26 is rotatably supported by the lower arm 30. An arm part 26a receiving force of steering is provided to protrude on the lower knuckle part 26.

The lower arm 30 is a member formed by metal, for example. A base end portion of the lower arm 30 is swingably supported on the floor part 12 in a position on the inner side in the vehicle width direction of the vehicle wheel 20. The axis as a center of swing of the base end portion of the lower arm 30 extends in a front-back direction of the vehicle body 10. The base end portion of the lower arm 30 may be swingably supported on the floor part 12 on an obliquely front side, an inner side, an obliquely back side, or a back side of the vehicle wheel 20. In these cases, a rotational axis of the swing of the lower arm 30 may extend in a right-left direction of the vehicle body 10, a front-back direction, or an oblique direction with respect to both the right-left direction and the front-back direction.

A tip end portion of the lower arm 30 extends toward an inner side of the fender apron 16 (herein, toward an outer side in the vehicle width direction) from the floor part 12. A bearing part 31 is provided to the tip end portion of the lower arm 30. The lower knuckle part 26 is rotatably supported on the tip end portion of the lower arm 30 via the bearing part 31. A rotational axis of the bearing part 31 is the steering rotation central axis around which the vehicle wheel 20 is rotated in the fender apron 16.

As described above, the base end portion of the lower arm 30 is swingably supported on the floor part 12, thus the lower arm 30 supports the vehicle wheel 20 to be movable in an up-down direction in the fender apron 16. The damper 28 intervenes between the upper knuckle part 25 and the vehicle body 10 while a movement direction of the vehicle wheel 20 is regulated by the lower arm 30. The damper 28 and the spring 27 externally mounted to the damper 28 absorb impact by concave-convex portions of a road surface in traveling.

A tie rod 32 is connected to a tip end portion of the arm part 26a. When a steering wheel 18 is rotated with steering by a driver, a rotational movement thereof is transmitted to the tie rod 32 as a movement in the vehicle width direction via a transmission mechanism 18b such as a steering shaft 18a and a rack-and-pinion mechanism. When the tie rod 32 is moved in the vehicle width direction, the lower knuckle part 26 can be rotated around the rotational axis of the bearing part 31. Accordingly, the vehicle wheel 20 can be rotated around the steering rotation central axis with the steering. A travel direction of the vehicle body 10 is changed by the rotation of the vehicle wheel 20 around the steering rotation central axis.

Each unit in the routing structure 40 of the wiring member is described in detail hereinafter.

<In-Wheel Motor Unit>

The in-wheel motor unit 41 includes the in-wheel motor 42 and the casing 44. The in-wheel motor unit 41 is incorporated into the vehicle wheel 20.

The in-wheel motor 42 is a motor for traveling to rotate the vehicle wheel 20. The in-wheel motor 42 includes a motor body 42a and a motor shaft 42b. The motor body 42a is a three-phase induction motor, for example. The motor body 42a may be a motor other than a three-phase induction motor, for example. The motor shaft 42b is rotary driven by the motor body 42a. The wheel hub is attached to the motor shaft 42b. The motor shaft 42b and the wheel hub may be directly connected to each other, or may also be attached via a transmission mechanism such as a gear or a speed reduction mechanism, for example. When the wheel hub is rotated in accordance with the rotation of the motor shaft 42b, the disk part 22a fixed to the wheel hub is also rotated, and the vehicle wheel 20 is thereby rotated.

A wiring connection part 43 is provided to the in-wheel motor 42. The wiring connection part 43 is connected to the wiring member 50. The wiring connection part 43 is a connector 43 herein. The connector 43 includes a terminal extending from a circuit of the motor body 42a and a housing for housing the terminal, for example. The wiring connection part 43 needs not be the connector 43. For example, the wiring connection part may be a terminal table provided with a bolt fixing part. The wiring connection part 43 is exposed to an outer side in one side surface 44a of the casing 44.

The casing 44 houses the in-wheel motor 42. The casing 44 is fixed to the knuckle parts 25 and 26 rotatably supporting the wheel hub. In the example illustrated in FIG. 1, the casing 44 is provided between the upper knuckle part 25 and the lower knuckle part 26. The casing 44 is formed of metal or resin, for example. The casing 44 may be made up of one component or a combination of a plurality of components.

A wiring fixing part 45 is provided to the casing 44. Herein, a concave portion 46 is formed in the casing 44. The wiring fixing part 45 is provided to an opening part of the concave portion 46. The wiring connection part 43 is located on a bottom portion of the concave portion 46. The casing 44 includes a heat radiation fin 47. At least a part of the heat radiation fin 47 is used as the wiring fixing part 45.

The heat radiation fin 47 is provided to the side surface 44a where the wiring connection part 43 is exposed in the casing 44. The heat radiation fin 47 is formed into a plate-like shape protruding from the side surface 44a toward an outer side. The side surface 44a is directed to an inner side in the vehicle width direction in the example illustrated in FIG. 1. The side surface 44a may be directed to the other direction. The wiring connection part 43 is exposed to an outer side through a hole formed in the side surface 44a. In the example illustrated in FIG. 1, the wiring connection part 43 protrudes to an outer side of the side surface 44a. The wiring connection part 43 may not protrude to the outer side of the side surface 44a.

Herein, the plurality of heat radiation fins 47 are provided in parallel to each other. Some heat radiation fin 47a is disconnected in an intermediate region. The region where the heat radiation fin 47 is disconnected is the concave portion 46. That is to say, the concave portion 46 is a portion surrounded by the heat radiation fin 47. Herein, a boss 48 is provided to the portion where the heat radiation fins 47 is disconnected.

The boss 48 is formed into a cylindrical shape. The boss 48 is provided to the side surface 44a of the casing 44 to surround the wiring connection part 43. The boss 48 may be formed into a shape other than the cylindrical shape. An inner portion of the boss 48 is the concave portion 46. The boss 48 is a peripheral wall of the concave portion 46. The peripheral wall 48 is formed into an annular shape. A screw-shaped part 49 is provided to the peripheral wall 48. Herein, the screw-shaped part 49 is provided to an inner surface of the opening part of the peripheral wall 48.

<Wiring Member>

The wiring member 50 includes at least one wire-like transmission member transmitting electrical power or light. The wire-like transmission member is an electrical wire or an optical fiber cable, for example. Herein, the wiring member 50 includes an electrical wire for supplying electrical power to the in-wheel motor 42. FIG. 3 illustrates an example that the wiring member 50 includes four electrical wires 53, 54, 55, and 56.

Each of the electrical wires 53, 54, 55, and 56 is a covering wire having a core wire covered with a covering. Each of the electrical wires 53, 54, 55, and 56 is a single wire having one conductive route. A cable made up of the plurality of core wires collected together by a covering part as an extrusion covering may be adopted in place of the plurality of single wires. The electrical wires 53, 54, and 55 are power source wires supplying three-phase alternating current to the in-wheel motor 42, for example. The electrical wire 56 is a signal wire transmitting a signal, for example. The electrical wire 56 is a signal wire for a sensor or control. The wiring member 50 may include an optical fiber cable in place of or in addition to the electrical wires 53, 54, 55, and 56. The plurality of electrical wires 53, 54, 55, and 56 are collected by a sheath 57. For example, the sheath 57 is an extrusion covering around the plurality of electrical wires 53, 54, 55, and 56.

Any shape is applicable as a transverse-sectional outer shape of the wiring member 50 in a portion collected by the sheath 57. FIG. 3 illustrates an example that the transverse-sectional outer shape of the wiring member 50 has a circular shape. The transverse-sectional outer shape of the wiring member 50 may be an oval shape or a rectangular shape, for example. The transverse-sectional surface is a cross-sectional surface in a plane perpendicular to an axis of the wiring member 50.

One end portion of the wiring member 50 is connected to the vehicle body side apparatus 80. One end portion of the wiring member 50 may be connector-connected to the vehicle body side apparatus 80. The wiring member 50 may be directly drawn from the vehicle body side apparatus 80. One end portion of the wiring member 50 may be connected to the vehicle body side apparatus 80 via the other wiring member. The vehicle body side apparatus 80 is assumed to be a drive unit driving the in-wheel motor 42. For example, when the in-wheel motor 42 is a three-phase induction motor, the vehicle body side apparatus 80 is assumed to be an inverter unit for supplying three-phase alternating current of U phase, V phase, and W phase for driving the in-wheel motor 42.

The other end portion of the wiring member 50 is connected to the in-wheel motor 42. A connector 58 is provided to the other end portion of the wiring member. The end portions of the plurality of electrical wires 53, 54, 55, and 56 are housed in a housing of the connector 58. The wiring member 50 and the in-wheel motor 42 are connected to each other via the connectors 58 and 43. The wiring member 50 and the in-wheel motor 42 may be directly connected to each other without intervention of the connectors 58 and 43. The plurality of electrical wires 53, 54, 55, and 56 may be branched and connected to the other positions, respectively, in the other portion of the wiring member 50.

The route of the wiring member 50 from the vehicle body side apparatus 80 toward the in-wheel motor 42 can be appropriately set. The route of the wiring member 50 is set as follows in the example illustrated in FIG. 1, for example. The wiring member 50 extends from the vehicle body side apparatus 80 in the vehicle body 10 to pass through the fender apron 16, and is led into the fender apron 16. In the fender apron 16, the wiring member 50 goes through a side portion of the damper 28, the tip end portion of the upper knuckle part 25, and an area between the upper knuckle part 25 and the lower knuckle part 26 to be led toward the in-wheel motor unit 41. In the in-wheel motor unit 41, the wiring member 50 extends from the opening part of the concave portion 46 of the casing 44 toward the bottom portion, and is connected to the wiring connection part 43 of the in-wheel motor 42 in a position of the bottom portion.

The end portion of the wiring member 50 connected and fixed to the in-wheel motor 42 is a first fixing portion 51. The first fixing portion 51 is fixed to the wiring connection part 43. The first fixing portion 51 is fixed to a position in the bottom portion of the concave portion 46. In the first fixing portion 51, the plurality of electrical wires 53, 54, 55, and 56 extend from an end portion of the sheath 57 and are separated from each other.

A portion of the wiring member 50 fixed to the vehicle subsequent to the end portion thereof connected to the in-wheel motor 42 is a second fixing portion 52. The second fixing portion 52 is fixed to the wiring fixing part 45. The second fixing portion 52 is fixed to a portion of the casing 44 forming the opening part of the concave portion 46. In the second fixing portion 52, the plurality of electrical wires 53, 54, 55, and 56 are collected by the sheath 57. Accordingly, the end portion of the sheath 57 is located between the first fixing portion 51 and the second fixing portion 52.

The wiring member 50 extends along the casing 44 between the first fixing portion 51 and the second fixing portion 52. Then, the wiring member 50 extends toward a side of the vehicle body away from the casing 44 from a position of the second fixing portion 52. In this case, one end portion of a portion of the wiring member 50 extending along the casing 44 is the first fixing portion 51, and the other end portion thereof is the second fixing portion 52. A portion of the wiring member 50 extending along the casing 44 is a portion extending inside the casing 44 or extending along a surface of the casing 44.

The second fixing portion 52 is fixed to a peripheral wall 48 of the concave portion 46 via the cover member 60. Accordingly, the routing structure 40 of the wiring member further includes the cover member 60 herein. A portion of the wiring member 50 closer to a side of the vehicle body 10 than the second fixing portion 52 is supported by the support member 70 in the fender apron 16. Accordingly, the routing structure 40 of the wiring member further includes the support member 70 herein.

<Cover Member>

The cover member 60 is provided around the wiring member 50 in the second fixing portion 52. The cover member 60 covers the opening part of the concave portion 46. The cover member 60 is fitted in a side of an inner periphery of the peripheral wall 48 in the opening part of the concave portion 46. The cover member 60 may not be fitted in the side of the inner periphery of the peripheral wall 48. For example, the cover member may be located on an outer side of an end surface of the peripheral wall 48 to cover the opening part of the concave portion 46. For example, it is also applicable that a protruding part protruding on an outer edge of the cover member in an axial direction is provided, and the peripheral wall 48 is fitted in a side of an inner periphery of the protruding part. The cover member 60 includes a body part 62 and an outer peripheral part 64.

The body part 62 is formed of an elastic material. Any shape is applicable as a shape of the body part 62. Herein, an outer shape of the body part 62 is formed to have a circular shape. It is sufficient that the outer shape of the body part 62 is formed to have a shape corresponding to a transverse-sectional shape of the concave portion 46. A hole 62h is formed in the body part 62.

The hole 62h passes through the body part 62. The hole 62h passes through a surface of the body part 62 facing the bottom portion of the concave portion 46 and a surface thereof on a side opposite to the surface facing the bottom portion. The wiring member 50 passes through the hole 62h to extend from one side to the other side of the cover member 60. Any shape is applicable as a shape of the hole 62h. It is sufficient that the hole 62h is formed to have a shape corresponding to a transverse-sectional shape of the second fixing portion 52. A portion of the wiring member 50 provided with the sheath 57 passes through the hole 62h herein. An outer shape of the sheath 57 is a circular shape, thus the hole 62h is formed into a circular shape.

The plurality of electrical wires 53, 54, 55, and 56 are collected together by the sheath 57, thus one hole 62h is provided. When the plurality of electrical wires 53, 54, 55, and 56 are not collected together, one or the plurality of holes 62h may be provided. When the plurality of holes 62h are provided, the arrangement of the plurality of holes 62h and the arrangement of the plurality of electrical wires 53, 54, 55, and 56 passed through the plurality of holes 62h may correspond to the arrangement of the plurality of electrical wires 53, 54, 55, and 56 in the connector 58.

Any size is applicable as a size of the hole 62*h* before the wiring member 50 is passed through the hole 62*h*. The size of the hole 62*h* before the wiring member 50 is passed through the hole 62*h* may be equal to or slightly smaller than the size of the wiring member 50 (the size of the sheath 57 herein). In this case, it is sufficient that the hole 62*h* is extended when the wiring member 50 is passed. The size of the hole 62*h* before the wiring member 50 is passed may be slightly larger than the size of the wiring member 50 (the size of the sheath 57 herein). A water stop agent may be provided between the hole 62*h* and the wiring member 50. Any dimension is applicable as a length dimension of the hole 62*h* (a thickness dimension of the body part 62). The hole 62*h* is preferably as short as possible from a viewpoint that the wiring member 50 passes through the hole 62*h*. The hole 62*h* preferably has enough length to be able to hold the wiring member 50 from a viewpoint of holding the wiring member 50 by the hole 62*h*.

Any position is applicable as a position of the hole 62*h* in the body part 62. The position of the hole 62*h* may be set in accordance with a position coaxial with the wiring connection part 43. The position coaxial with the wiring connection part 43 is a position where the wiring connection part 43 and the hole 62*h* are overlapped with each other in a front view of the casing 44 as illustrated in FIG. 2. Accordingly, the wiring member 50 can extend without bending as much as possible from the first fixing portion 51 toward the second fixing portion 52.

The outer peripheral part 64 is a portion provided around the body part 62. The outer peripheral part 64 includes a screw-shaped part 65. The screw-shaped part 65 is formed of a material having higher rigidity than an elastic material. Herein, the screw-shaped part 65 is provided to an outward surface of the outer peripheral part 64. A screw-shaped part 65 is screwed to a screw-shaped part 49 of the peripheral wall 48. The screw-shaped parts 49 and 65 are formed into a corresponding shape. It is applicable that the outer peripheral part 64 includes a portion protruding along an axial direction of the cover member 60, and the screw-shaped part is provided to an inward surface of the protruding part.

The screw-shaped part 65 and the body part 62 in the outer peripheral part 64 are preferably rotatable. Accordingly, when the screw-shaped parts 49 and 65 are screwed or when screwing of the screw-shaped parts 49 and 65 is released, the rotation of the wiring member 50 passed through the body part 62 is suppressed. For example, the outer peripheral part 64 may include a bearing rotatably connecting the screw-shaped part 65 and the body part 62. It is also applicable that a bearing is provided to a side of an outer periphery of the body part 62 and the screw-shaped part 65 is provided to a side of an outer periphery of the bearing.

It is sufficient that a rotation of the body part 62 with respect to the screw-shaped part 65 is suppressed while the screw-shaped parts 49 and 65 are screwed. Accordingly, the rotation of the wiring member 50 passed through the body part 62 is suppressed while the screw-shaped parts 49 and 65 are screwed. For example, a portion of the peripheral wall 48 closer to a side of the bottom portion than the screw-shaped part 49 protrudes to a side of an inner periphery, and a level difference S is provided. A level difference portion of the peripheral wall 48 and an outer edge of the body part 62 are firmly attached to each other while the screw-shaped parts 49 and 65 are screwed. Accordingly, the rotation of the body part 62 with respect to the screw-shaped part 65 is sup- pressed by friction between the peripheral wall 48 and the body part 62 while the screw-shaped parts 49 and 65 are screwed.

Figure 4:
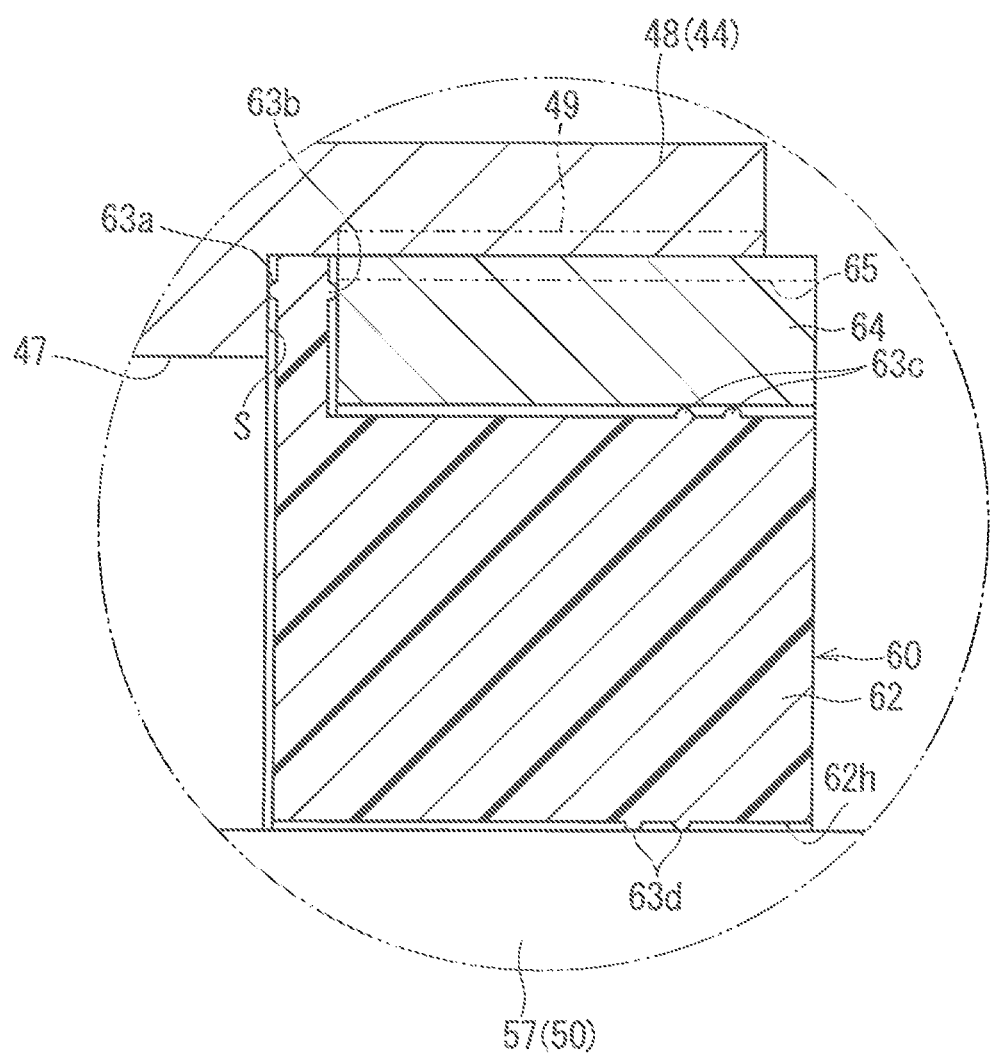
FIG. 4 is an enlarged view of a region A in FIG. 3.

Herein, water stop processing is performed on an inner portion of the concave portion 46 by the cover member 60. This configuration is described in detail with reference to FIG. 4. FIG. 4 is an enlarged view of the region A in FIG. 3.

Specifically, the body part 62 of the cover member 60 is firmly attached to each of the casing 44, the outer peripheral part 64, and the wiring member 50. Accordingly, suppressed is ingress of water between the body part 62 and each of the casing 44, the outer peripheral part 64, and the wiring member 50. Herein, the body part 62 is firmly attached to the outer peripheral part 64 and the wiring member 50 in a radial direction of the wiring member 50, and is firmly attached to the outer peripheral part 64 and the casing 44 in a longitudinal direction of the wiring member 50. At this time, a lip is provided to portions of the body part 62 having contact with each of the casing 44, the outer peripheral part 64, and the wiring member 50. A first lip 63*a*, second lips 63*b* and 63*c*, and a third lip 63*d* are provided as such lips in the example illustrated in FIG. 4.

The first lip 63*a* is provided in a portion of the body part 62 having contact with the casing 44. More specifically, the level difference S of the peripheral wall 48 in the casing 44 is annularly formed. An outer peripheral edge portion of an end surface of the body part 62 directed to the axial direction has contact with the level difference S. The first lip 63*a* is annularly provided to the outer peripheral edge portion of the body part 62. The first lip 63*a* and the level difference S are arranged side by side in the axial direction. The annular first lip 63*a* has contact with the level difference S over a whole periphery thereof. The first lip 63*a* may be sandwiched and pressed by the level difference S and the outer peripheral part 64 in the axial direction while the screw-shaped parts 49 and 65 are screwed.

The second lips 63*b* and 63*c* are provided in a portion of the body part 62 having contact with the outer peripheral part 64. More specifically, the second lip 63*b* is annularly provided to a rear surface of the end surface of the body part 62 provided with the first lip 63*a*. In the example illustrated in FIG. 4, the second lip 63*b* is provided to an immediately rear side of the first lip 63*a*, however, the first lip 63*a* and the second lip 63*b* may be separately provided on inner and outer sides along the radial direction. The second lip 63*b* and the outer peripheral part 64 are arranged side by side in the axial direction. The annular second lip 63*b* has contact with the annular end surface of the outer peripheral part 64 over a whole periphery thereof. The second lip 63*b* may be sandwiched and pressed by the level difference S and the outer peripheral part 64 in the axial direction while the screw-shaped parts 49 and 65 are screwed.

The second lip 63*c* is annularly provided over a whole periphery of an outer peripheral surface of the body part 62 facing an inner peripheral surface of the outer peripheral part 64. In the example illustrated in FIG. 4, two second lips 63*c* are provided away from each other in the axial direction on the outer peripheral surface of the body part 62. The second lip 63*c* and the outer peripheral part 64 are arranged side by side in the radial direction. The annular second lip 63*c* has contact with the inner peripheral surface of the outer peripheral part 64 over a whole periphery thereof.

The third lip 63*d* is provided in a portion of the body part 62 having contact with the wiring member 50. More specifically, the third lip 63*d* is annularly provided to an inner peripheral surface of the hole 62*h* of the body part 62 over a whole periphery thereof. In the example illustrated in FIG. 4, two third lips 63d are provided away from each other in the axial direction on the outer peripheral surface of the hole 62h. The third lip 63d and the sheath 57 of the wiring member 50 are arranged side by side in the radial direction. The annular third lip 63d has contact with the outer peripheral surface of the sheath 57 over a whole periphery thereof.

Water stop processing needs not be performed on the inner portion of the concave portion 46 by the cover member 60. Even in a case where water stop processing is performed on the inner portion of the concave portion 46 by the cover member 60, a structure thereof is not limited thereto described above. For example, in the example illustrated in FIG. 4, one first lip 63a, one second lip 63b, two second lips 63c, and two third lips 63d are provided, however, the number of each of the lips is not limited thereto, but can be appropriately set. In the example illustrated in FIG. 4, two types of second lips 63b and 63c are provided, however, one of the second lip 63b and the second lip 63c may be omitted. In the example illustrated in FIG. 4, the screw-shaped parts 49 and 65 are screwed and attached to the casing 44, however, the cover member may be pressed in the casing 44.

Furthermore, the cover member 60 may have an oil sealing property. For example, it is also applicable that oil is provided inside the concave portion 46, and leakage of the oil from the concave portion 46 is suppressed by the cover member 60. The configuration of the cover member having such an oil sealing property is not particularly limited, however, the cover member may include a bias member on an outer side of the third lip 63d to bias the third lip 63d toward the wiring member 50. In this case, it is applicable that an attachment part to which the bias member is attached is provided to the body part 62. The bias member may be made up of a spring member such as a coil spring annularly formed, for example.

The cover member 60 is a member molded separately from the wiring member 50, and is mounted to the wiring member 50 afterward.

<Support Member 70>

In the example illustrated in FIG. 1, the support member 70 is attached to the wiring member 50. The support member 70 is supported on the upper knuckle part 25. For example, the support member 70 is a bracket. The bracket is screwed to an attachment target.

Any member is applicable as the support member 70 as long as it supports the area between the second fixing portion 52 of the wiring member 50 and the vehicle body side apparatus 80 in the routing state described above, and a configuration therefor is not particularly limited. The support member may be a single support member, or may include a plurality of support parts. The support member may be supported on a side of the vehicle body 10 or a side of the vehicle wheel 20. Herein, the state where the support member is supported on the side of the vehicle body 10 indicates that the support member is supported in a portion which is not rotated even when the vehicle wheel 20 is rotated around the steering rotation central axis X. For example, applied is a case where the support member is supported by the vehicle body 10, the damper 28 or the lower arm 30 described above. The state where the support member 70 is supported on the side of the vehicle wheel 20 indicates that the support member 70 is supported in a portion rotated in accordance with a rotation of the vehicle wheel 20 around the steering rotation central axis X. For example, applied is a case where the support member 70 is supported by the upper knuckle part 25 or the lower knuckle part 26 described above.

It is sufficient that one of or both the cover member 60 and the support member 70 are previously attached to the wiring member 50 before being attached to the vehicle. The wiring member 50 to which one of or both the cover member 60 and the support member 70 are previously attached can also be considered a wiring module. In a wiring module in which both the cover member 60 and the support member 70 are previously attached to the wiring member 50, the cover member 60 and the support member 70 are provided in this order from a side of an end portion connected to the in-wheel motor 42.

Effect Etc. of Embodiment 1

According to the routing structure 40 of the wiring member having the above configuration, the second fixing portion 52 is fixed to the wiring fixing part 45 of the casing 44, thus the second fixing portion 52 needs not be fixed to a component disposed around the in-wheel motor unit 41. Accordingly, a degree of freedom of routes of the electrical wires 53, 54, 55, and 56 connected to an in-wheel motor unit 41 can be increased. More specifically, in order to reduce force applied to the end portion of the wiring member 50, a position of a fixing portion subsequent to the end portion is set to be near the end portion (for example, a position within X mm based on the end portion. X is any value ranging from 100 to 300, for example) in some cases. When the position of the fixing portion subsequent to the end portion is set to a surrounding component near the in-wheel motor 42 in this range, there is a possibility that a degree of freedom of the route of the wiring member 50 is reduced by limiting the fixing position. In the meanwhile, herein, when the second fixing portion 52 is fixed to the wiring fixing part 45 of the casing 44, the degree of freedom of the route of the vehicle body side apparatus 80 is increased more than the second fixing portion 52. A degree of freedom of the position where the support member 70 is attached is also increased.

The first fixing portion 51 is fixed to a position in the bottom portion of the concave portion 46, and the second fixing portion 52 is fixed to a position of the opening part of the concave portion 46. Accordingly, the wiring member 50 can be fixed without bending as much as possible between the first fixing portion 51 and the second fixing portion 52.

The casing 44 includes a heat radiation fin 47 provided to a peripheral edge of the opening part of the concave portion 46. Accordingly, the concave portion 46 can be provided using a space for providing the heat radiation fin 47. The heat radiation fin 47 constitutes a part of the wiring fixing part 45. The concave portion 46 is formed in a portion of the casing 44 protruding by providing the heat radiation fin 47. Accordingly, increase in a dimension of the casing 44 caused by forming the concave portion 46 can be suppressed.

The wiring member 50 further includes the cover member 60 provided around the wiring member 50 in the second fixing portion 52 to be attached to the opening part of the concave portion 46. Accordingly, the second fixing portion 52 can be simply attached to the casing 44 via the cover member 60.

The body part 62 of the cover member 60 is formed by the elastic material, thus can be firmly attached to the electrical wires 53, 54, 55, and 56, and slip of the electrical wires 53, 54, 55, and 56 can be suppressed. The cover member 60 is simply attached to the casing 44 by the outer peripheral part 64 of the cover member 60 formed to have the screw-like shape.

The peripheral wall 48 of the concave portion 46 and the cover member 60 stop water inside the concave portion 46.

Specifically, the body part 62 is firmly attached to each of the casing 44, the outer peripheral part 64, and the wiring member 50. Accordingly, a simple water stop structure of stopping water inside the concave portion 46 is provided. The first lip 63a, the second lips 63b and 63c, and the third lip 63d are provided to the portions of the body part 62 having contact with each of the casing 44, the outer peripheral part 64, and the wiring member 50. Accordingly, a water stop property inside the concave portion 46 is improved.

The end portion of the sheath 57 is located between the first fixing portion 51 and the second fixing portion 52. Accordingly, the plurality of electrical wires 53, 54, 55, and 56 can be easily handled when the second fixing portion 52 is attached to the casing 44.

Modification Example

In the above description, the concave portion 46 is formed in the casing 44, however, this configuration is not necessary. For example, the wiring connection part may be located in the side surface of the casing where the heat radiation fin is not formed. The wiring member 50 may be bended and routed between the first fixing portion 51 and the second fixing portion 52.

In the above description, the heat radiation fin 47 is provided on the peripheral edge of the opening part of the concave portion 46, however, this configuration is not necessary. The concave portion 46 may be formed in a portion of the casing where the heat radiation fin 47 is not provided.

In the above description, the second fixing portion 52 is fixed to the wiring fixing part 45 by the cover member 60, however, this configuration is not necessary. For example, the second fixing portion 52 may be fixed to the wiring fixing part 45 by a component such as a bracket other than the cover member 60. It is also applicable that the wiring fixing part 45 is formed into the shape such as a clip-like shape capable of directly supporting the wiring member 50 to directly fix the second fixing portion 52 to the casing 44.

In the above description, the cover member 60 includes the body part 62 formed of the elastic material and the outer peripheral part 64 having higher rigidity than the body part 62, however, this configuration is not necessary. For example, the outer peripheral part 64 may be omitted in the cover member. In this case, the cover member may be pressed into the opening part of the concave portion 46. For example, the cover member may be attached to the concave portion 46 by a screw different from the screw-shaped parts 49 and 65. At this time, it is also applicable that a screw receiver is provided to an outer side of the peripheral wall of the concave portion, and a screw hole is provided in a position of the outer peripheral part corresponding to the screw receiver. For example, the cover member may be an insert molding body in which the wiring member 50 as an insert object is insert molded.

In the above description, the plurality of electrical wires 53, 54, 55, and 56 are collected together by the sheath 57, however, this configuration is not necessary. The plurality of electrical wires 53, 54, 55, and 56 may not be collected together. For example, a protection member other than the sheath 57 may be a member collecting the plurality of electrical wires 53, 54, 55, and 56. The protection member may be a corrugate tube, an adhesive tape helically wound, or a resin or metal tube, for example. The plurality of electrical wires 53, 54, 55, and 56 need not be collected together over the whole range in the longitudinal direction thereof. For example, it is also applicable that the sheath 57 described above is omitted, and the plurality of electrical wires 53, 54, 55, and 56 are collected together by the cover member 60 or a bracket supporting the wiring member 50 in a constant position. The bracket herein may be the support member 70.

The wiring member 50 may include a wiring other than the electrical wires 53, 54, 55, and 56 for the in-wheel motor unit 41. The wiring is connected to a peripheral apparatus disposed around the in-wheel motor unit 41. For example, a sensor or an electrical brake is assumed as the peripheral apparatus. For example, the sensor may be a sensor detecting a rotational speed of the vehicle wheel 20 or a temperature sensor detecting a temperature of the in-wheel motor 42. The electrical brake may be an electrical parking brake used in parking or stopping an automobile or a brake used in traveling of an automobile.

A connection part between these peripheral apparatuses and the wirings for the peripheral apparatuses may be provided in the same position as or a position different from the connection part between the electrical wires 53, 54, 55, and 56 and the in-wheel motor 42. When the connection part between the peripheral apparatus and the wiring for the peripheral apparatus is provided in a position different from the connection part between the electrical wires 53, 54, 55, and 56 and the in-wheel motor 42, the electrical wires 53, 54, 55, and 56 and the wiring for the peripheral apparatus may be branched at a position closer to the vehicle body side apparatus 80 than the cover member 60.

It is sufficient that the vehicle body side apparatus connected to the peripheral apparatus by the wiring for the peripheral apparatus is an apparatus transmitting or receiving a signal to or from the peripheral apparatus or supplying electrical power. For example, the vehicle body side apparatus may include a function as an electronic control unit (ECU) receiving a signal from a sensor or controlling the electrical brake described above. The vehicle body side apparatus may be provided inside or outside the vehicle body 10.

The configurations described in the embodiments and modification examples thereof can be appropriately combined as long as they are not contradictory.

EXPLANATION OF REFERENCE SIGNS 10 vehicle body
12 floor part
14 body part
16 fender apron
18 steering wheel
18a steering shaft
18b transmission mechanism
20 vehicle wheel
22 disk wheel
22a disk part
22b tire attachment part
24 tire
25 upper knuckle part
26 lower knuckle part
26a arm part
27 spring
28 damper
29 bearing part
30 lower arm
31 bearing part
32 tie rod
40 routing structure
41 in-wheel motor unit
42 in-wheel motor 42*a* motor body
42*b* shaft
43 wiring connection part (connector)
44 casing
44*a* side surface
45 wiring fixing part
46 concave portion
47 heat radiation fin
48 boss (peripheral wall of concave portion)
49 screw-shaped part
50 wiring member
51 first fixing portion
52 second fixing portion
53, 54, 55, and 56 electrical wiring
57 sheath
58 connector
60 cover member
62 body part
62*h* hole
63*a* first lip
63*b*, 63*c* second lip
63*d* third lip
64 outer peripheral part
65 screw-shaped part
70 support member
80 vehicle body side apparatus

The invention claimed is:

1. A routing structure of a wiring member, comprising:
an in-wheel motor unit including an in-wheel motor and a casing housing the in-wheel motor; and
a wiring member configured to connect the in-wheel motor and a vehicle body side apparatus, wherein
the wiring member includes (i) a first fixing portion at a first end portion of the wiring member, the first fixing portion being connected to the in-wheel motor; (ii) a second end portion configured to connect to the vehicle body side apparatus; and (iii) a second fixing portion fixed to a vehicle, the second fixing portion being between the first end portion and the second end portion,
a wiring fixing part to which the second fixing portion is fixed is provided to the casing at a location closer to the first end portion than to the second end portion, and
a concave portion is formed in the casing, the first fixing portion is fixed to a position of a bottom portion of the concave portion, and the second fixing portion is fixed to a portion of the casing forming an opening part of the concave portion.

2. The routing structure of the wiring member according to claim 1, wherein
the casing includes a heat radiation fin, and
at least a part of the heat radiation fin is used as the wiring fixing part.

3. The routing structure of the wiring member according to claim 1, further comprising
a cover member provided around the wiring member in the second fixing portion to cover the opening part.

4. The routing structure of the wiring member according to claim 3, wherein
the cover member includes a body part and an outer peripheral part around the body part,
the body part is formed of an elastic material,
the wiring member passes through a hole formed in the body part, and
the outer peripheral part includes a screw-shaped part formed to have a screw-like shape by a material having higher rigidity than the elastic material.

5. The routing structure of the wiring member according to claim 4, wherein
the body part is firmly attached to the outer peripheral part, the wiring member, and the casing.

6. The routing structure of the wiring member according to claim 5, wherein
the body part is provided with a first lip, a second lip, and a third lip,
the first lip is provided to a portion of the body part having contact with the casing,
the second lip is provided to a portion of the body part having contact with the outer peripheral part, and
the third lip is provided to a portion of the body part having contact with the wiring member.

7. The routing structure of the wiring member according to claim 1, wherein
the wiring member includes a plurality of wire-like transmission members and a sheath covering the plurality of wire-like transmission members, and
an end portion of the sheath is located between the first fixing portion and the second fixing portion.

* * * * *